US010371050B2

(12) United States Patent
Iwrey

(10) Patent No.: US 10,371,050 B2
(45) Date of Patent: Aug. 6, 2019

(54) GAS TURBINE ENGINE WITH ROTOR BLADE TIP CLEARANCE FLOW CONTROL

(71) Applicant: Rolls-Royce Corporation, Indianapolis, IN (US)

(72) Inventor: Benjamin M. Iwrey, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 872 days.

(21) Appl. No.: 14/928,504

(22) Filed: Oct. 30, 2015

(65) Prior Publication Data

US 2016/0177769 A1 Jun. 23, 2016

Related U.S. Application Data

(60) Provisional application No. 62/096,312, filed on Dec. 23, 2014.

(51) Int. Cl.
*F01D 11/20* (2006.01)
*F02C 7/04* (2006.01)
(Continued)

(52) U.S. Cl.
CPC ............ *F02C 7/04* (2013.01); *F01D 5/20* (2013.01); *F01D 11/08* (2013.01); *F04D 29/164* (2013.01);
(Continued)

(58) Field of Classification Search
CPC ...... F02C 7/04; F02C 9/16; F01D 5/20; F01D 11/08; F01D 11/24; F01D 17/00;
(Continued)

(56) References Cited

U.S. PATENT DOCUMENTS 4,722,668 A * 2/1988 Novacek .................. F01D 5/22
416/190
5,365,663 A * 11/1994 Demartini .............. G01H 1/006
29/889.2
(Continued)

FOREIGN PATENT DOCUMENTS

CA 2710007 A1 * 7/2009 ........... F04D 27/001
CA 2715206 A1 * 7/2009 ............. F01D 5/145

OTHER PUBLICATIONS

Van Ness II, D.K., et al., "Turbine Tip Clearance Flow Control using Plasma Actuators," 44th AIAA Aerospace Sciences Meeting and Exhibit, Aerospace Sciences Meetings, 2006, doi: 10.2514/6.2006-21.
(Continued)

*Primary Examiner* — Kenneth Bomberg
*Assistant Examiner* — Brian Delrue
(74) *Attorney, Agent, or Firm* — Barnes & Thornburg LLP

(57) ABSTRACT

A gas turbine engine system includes a drive shaft and a compressor located in a compressor case. The compressor has a number of rotors. Each rotor includes a number of blades radially extending from a rotor wheel and terminating in a blade tip. The blade tip terminates in close proximity to the case and defines a tip clearance. An air flow control system is coupled to the compressor. The air flow system includes inductive coils and plasma actuators coupled to the case and magnets coupled to the blade. The plasma actuators induce air flows in order to, for example, mitigate air flow leakage around the tip of the blade.

9 Claims, 7 Drawing Sheets

(51) Int. Cl.
*F01D 11/08* (2006.01)
*F04D 29/16* (2006.01)
*F04D 29/68* (2006.01)
*F01D 5/20* (2006.01)

(52) U.S. Cl.
CPC ...... *F04D 29/687* (2013.01); *F05D 2270/172* (2013.01); *Y02T 50/671* (2013.01); *Y02T 50/673* (2013.01)

(58) Field of Classification Search
CPC ................ F04D 29/164; F04D 29/687; F05D 2270/172; Y02T 50/671; Y02T 50/673
USPC ........................... 415/173; 701/100; 244/194
See application file for complete search history.

(56) References Cited

U.S. PATENT DOCUMENTS

| | | | | |
|---|---|---|---|---|
| 5,490,759 | A * | 2/1996 | Hoffman | F01D 5/26 415/10 |
| 5,709,527 | A * | 1/1998 | Ernst | F01D 5/26 415/10 |
| 6,027,306 | A * | 2/2000 | Bunker | F01D 5/20 415/115 |
| 6,685,429 | B2 | 2/2004 | Webster | |
| 7,380,756 | B1 * | 6/2008 | Enloe | B64C 23/005 244/130 |
| 7,588,413 | B2 | 9/2009 | Lee et al. | |
| 7,628,585 | B2 | 12/2009 | Lee et al. | |
| 7,695,241 | B2 | 4/2010 | Lee et al. | |
| 7,703,479 | B2 * | 4/2010 | Jacob | B64C 23/005 137/828 |
| 7,736,123 | B2 | 6/2010 | Lee et al. | |
| 7,819,626 | B2 | 10/2010 | Lee et al. | |
| 7,984,614 | B2 | 7/2011 | Nolcheff | |
| 8,091,950 | B2 * | 1/2012 | Corke | B62D 35/00 296/180.1 |
| 8,157,528 | B1 | 4/2012 | Khozikov et al. | |
| 8,162,610 | B1 | 4/2012 | Khozikov et al. | |
| 8,196,871 | B2 * | 6/2012 | Murray | F01D 5/16 244/204 |
| 8,282,336 | B2 * | 10/2012 | Wadia | F04D 27/001 415/1 |
| 8,282,337 | B2 * | 10/2012 | Wadia | F02K 3/06 415/1 |
| 8,308,112 | B2 * | 11/2012 | Wood | B64C 23/005 244/203 |
| 8,317,457 | B2 | 11/2012 | Wadia et al. | |
| 8,435,001 | B2 | 5/2013 | Montgomery et al. | |
| 8,500,404 | B2 | 8/2013 | Montgomery et al. | |
| 8,546,969 | B2 | 10/2013 | Rosefsky | |
| 8,568,088 | B2 * | 10/2013 | Richter | F01D 5/225 415/119 |
| 8,585,356 | B2 * | 11/2013 | Wiebe | F01D 11/10 415/173.2 |
| 9,541,106 | B1 * | 1/2017 | Patel | F15D 1/0065 |
| 9,549,456 | B2 * | 1/2017 | Roy | H05H 1/2406 |
| 2009/0065064 | A1 * | 3/2009 | Morris | F01D 11/20 137/2 |
| 2009/0169363 | A1 * | 7/2009 | Wadia | F04D 27/001 415/118 |
| 2009/0169367 | A1 * | 7/2009 | Wadia | F02K 3/06 415/151 |
| 2010/0040453 | A1 * | 2/2010 | Vo | F01D 11/20 415/1 |
| 2010/0183424 | A1 * | 7/2010 | Roy | F01D 5/20 415/1 |
| 2010/0224733 | A1 * | 9/2010 | Wood | B64C 23/005 244/205 |
| 2010/0278636 | A1 * | 11/2010 | Richter | F01D 5/225 415/119 |
| 2010/0290906 | A1 | 11/2010 | Moeckel et al. | |
| 2010/0310381 | A1 | 12/2010 | Roy | |
| 2010/0329838 | A1 * | 12/2010 | Greenblatt | B64C 23/005 415/1 |
| 2012/0301296 | A1 | 11/2012 | Greenblatt et al. | |

OTHER PUBLICATIONS

Jothiprasad G., et al., "Control of Tip-Clearance Flow in a Low Speed Axial Compressor Rotor With Plasma Actuation," J. Turbomach, 2011, 134(2),021019-021019-9, doi:10.1115/1.4003083.

* cited by examiner

US 10,371,050 B2

GAS TURBINE ENGINE WITH ROTOR BLADE TIP CLEARANCE FLOW CONTROL

CROSS REFERENCE TO RELATED APPLICATIONS

This application claims priority to and the benefit of U.S. Provisional Patent Application No. 62/096,312, filed 23 Dec. 2014, the disclosure of which is now expressly incorporated herein by reference.

FIELD OF THE DISCLOSURE

The present disclosure relates generally to gas turbine engines. More specifically, the present disclosure relates to an apparatus to provide rotor blade tip clearance control in a gas turbine engine.

BACKGROUND

Gas turbine engines are used to power aircraft, watercraft, power generators, and other vehicles and machines. Gas turbine engines typically include one or more compressors, a combustor, and one or more turbines. In typical aerospace applications, a fan or propeller is used to draw air into the engine and feeds the drawn-in air to the gas turbine core, which includes one or more compressors, a combustor, and one or more turbines. The compressor includes alternating stages of rotors (e.g., rotating disks with blades) and stators (e.g., static vanes), which increase the pressure of the drawn-in air as it travels through the gas turbine core. The compressor thus outputs higher-pressure air, which it delivers to the combustor. In the combustor, the fuel is mixed with the higher-pressure air and is ignited by an igniter. The products of the combustion reaction that occurs in the combustor (e.g., hot gas) are directed into a turbine. The turbine is typically made up of an assembly of rotors (e.g., rotating discs with blades), which are attached to turbine shafts, nozzle guide vanes, casings, and other structures. The turbine converts the thermal energy supplied by the combustion products into kinetic energy. The work extracted from the combustion products by the turbine may be used to drive the fan, the compressor, and, sometimes, an output shaft. Leftover products of the combustion are exhausted out of the engine and may provide thrust in some configurations.

Aerospace applications of gas turbine engines include turboshaft, turboprop, and turbofan engines. In typical aerospace applications, the gas turbine engine provides thrust to propel the aircraft, and also supplies power for engine accessories and aircraft accessories. Mechanical power is transferred from turbines to compressors through shaft and spline systems, with bearings providing axial and radial positioning of the rotating components. A drive shaft typically links the turbine and compressor sections of the turbine engine. In turbine engines having multiple turbine and compressor sections, there may be multiple, concentric, independently rotatable drive shafts. For example, a high pressure shaft may link a high pressure compressor with a high pressure turbine, while a low pressure shaft links the fan with a low pressure turbine. The low pressure shaft may be concentric with and disposed within the high pressure shaft.

SUMMARY

The present application discloses one or more of the features recited in the appended claims and/or the following features which, alone or in any combination, may comprise patentable subject matter.

An example 1 includes a gas turbine engine system including: a turbine engine including: a compressor case defining an interior region; in the interior region of the compressor: a drive shaft rotatable around an axis of rotation, and a compressor coupled to the drive shaft, the compressor having a plurality of rotor wheels and a plurality of blades extending radially from each of the rotor wheels, each of the blades having a root coupled to the rotor wheel and a tip spaced from the root by a length of the blade, each of the rotor wheels being rotatable with the drive shaft around the axis of rotation, each of the rotor wheels and corresponding blades defining a plane of rotation; and a plurality of plasma actuators coupled to the compressor case, the plasma actuators positioned adjacent the plane of rotation of at least one of the rotor wheels.

An example 2 includes the subject matter of example 1, and includes a plurality of inductive coils electrically coupled to the plasma actuators, where at least one of the inductive coils is positioned in the plane of rotation of one of the rotor wheels. An example 3 includes the subject matter of example 2, and includes a plurality of magnets coupled to the tips of the blades. An example 4 includes the subject matter of any of examples 1-3, where one of the plurality of inductive coils includes a coil of conductive wire coupled to the compressor case. An example 5 includes the subject matter of any of examples 1-4, where each of the plurality of plasma actuators is of the single dielectric barrier discharge type. An example 6 includes the subject matter of any of examples 1-5, where each of the plurality of plasma actuators is coupled to the compressor case. An example 7 includes the subject matter of any of examples 1-6, where at least one of the plurality of plasma actuators is axially offset from a plane of rotation of a rotor wheel. An example 8 includes the subject matter of example 7, where at least one of the plurality of plasma actuators is positioned on an upstream side of a plane of rotation of a rotor wheel. An example 9 includes the subject matter of example 7, where at least one of the plurality of plasma actuators is positioned on a downstream side of a plane of rotation of a rotor wheel. An example 10 includes the subject matter of example any of examples 1-9, where at least one of the plurality of plasma actuators is positioned within a plane of rotation of a rotor wheel.

An example 11 includes a gas turbine engine system including: a turbine engine including: a compressor case defining an interior region; within the interior region of the compressor: a drive shaft rotatable around an axis of rotation, and a compressor coupled to the drive shaft, the compressor having a plurality of rotor wheels and a plurality of blades extending radially from each of the rotor wheels, each of the blades having a root coupled to the rotor wheel and a tip spaced from the root by a length of the blade, each of the rotor wheels being rotatable with the drive shaft around the axis of rotation, each of the rotor wheels and corresponding blades defining a plane of rotation; and a plurality of plasma actuators coupled to the blades substantially near the tips of each of the blades.

An example 12 includes the subject matter of example 11 and includes a plurality of inductive coils coupled to the tips of the blades and electrically coupled to the plasma actuators. An example 13 includes the subject matter of example 12 and includes a plurality of magnets coupled to the compressor case, positioned to be in a plane of rotation of a rotor wheel. An example 14 includes the subject matter of example 13, where one of the plurality of inductive coils includes a conductive wire coupled to the blades.

An example 15 includes a blade positioning system for a gas turbine engine including: a turbine engine including: a compressor drive shaft, and a compressor having a plurality of rotor wheels and a plurality of blades, each having a root end and a tip end, extending radially from each rotor wheel, each of the rotor wheels being rotatable with the compressor drive shaft and rotatable about the compressor drive shaft, each of the rotor wheels defining a plane of rotation, and a compressor case surrounding the plurality of blades and the plurality of rotor wheels; a plurality of inductive coils electrically connected to the plasma actuators and coupled to the compressor case positioned to be in the plane of rotation of each of the rotor wheels; a plurality of magnets coupled to the tip ends of the plurality of blades, positioned such that the plurality of magnets interact electromagnetically with the plurality of inductive coils; and a blade positioning module electrically connected to an inductive coil configured to determine the position of the blades based on the varying magnetic flux induced in the coil by the moving magnets.

An example 16 includes the subject matter of example 15, where in the blade positioning module is used to detect flutter and forced vibration in the gas turbine engine. An example 17 includes the subject matter of example 15 or claim 16, where the blade positioning module is electrically connected to a number of the plurality of inductive coils.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
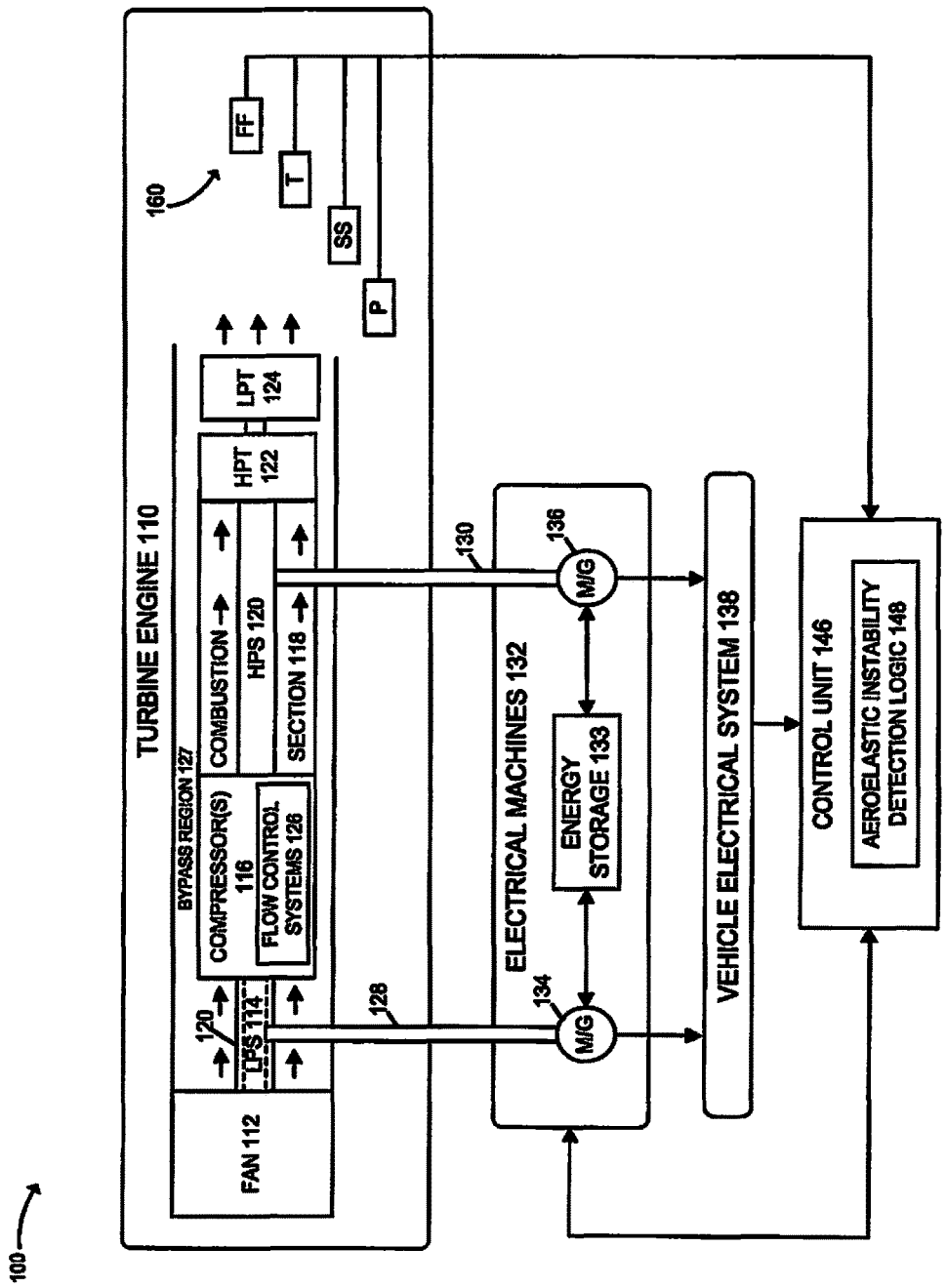
FIG. 1 is a simplified block diagram of at least one embodiment of a gas turbine engine system including at least one flow control system and aeroelastic instability detection logic as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

A compressor of a turbine engine may have multiple stages, each of which includes a rotor and a stator. Alternatively, the compressor may be embodied as a centrifugal or mixed-flow compressor, or as a single- or multi-stage fan. In a multistage compressor, the rotor of each compressor stage is equipped with rotor blades. Each blade has a tip that is in close proximity to the gas turbine engine case. While a small tip clearance is mechanically necessary in a gas turbine engine, gases can "leak" through the tip clearance in the opposite direction of the main flowfield causing aerodynamic turbulence and losses of operational efficiency of the gas turbine engine. In some cases, tip flow leakage can account for in the range of about 20% to 40% of the total energy losses in a gas turbine engine. Rotor tip clearance flow and its interaction with the "main" flowfield are contributors to inefficiencies and instability in a gas turbine engine, and can cause flutter or forced vibrations that can damage the engine and reduce performance.

In order for a multistage compressor to operate most efficiently, all of the intake gases that are drawn into the gas turbine engine flow uniformly toward the exhaust side of the gas turbine engine. The blade tip gap allows air to leak over the blade tip in the opposite direction of the intended air flow. The air that leaks back over the rotor blade tip interacts with the rest of the flow field of the gas turbine engine, and that interaction can result in serious debits to efficiency and operability margin. The air that leaks back over the rotor blade tip also can cause other unwanted effects, such as blade tip unloading, boundary layer and pressure field unsteadiness, and vibration and flutter on downstream blade stages. These resulting problems can inhibit the performance and the operability of the gas turbine engine.

Figure 3A:
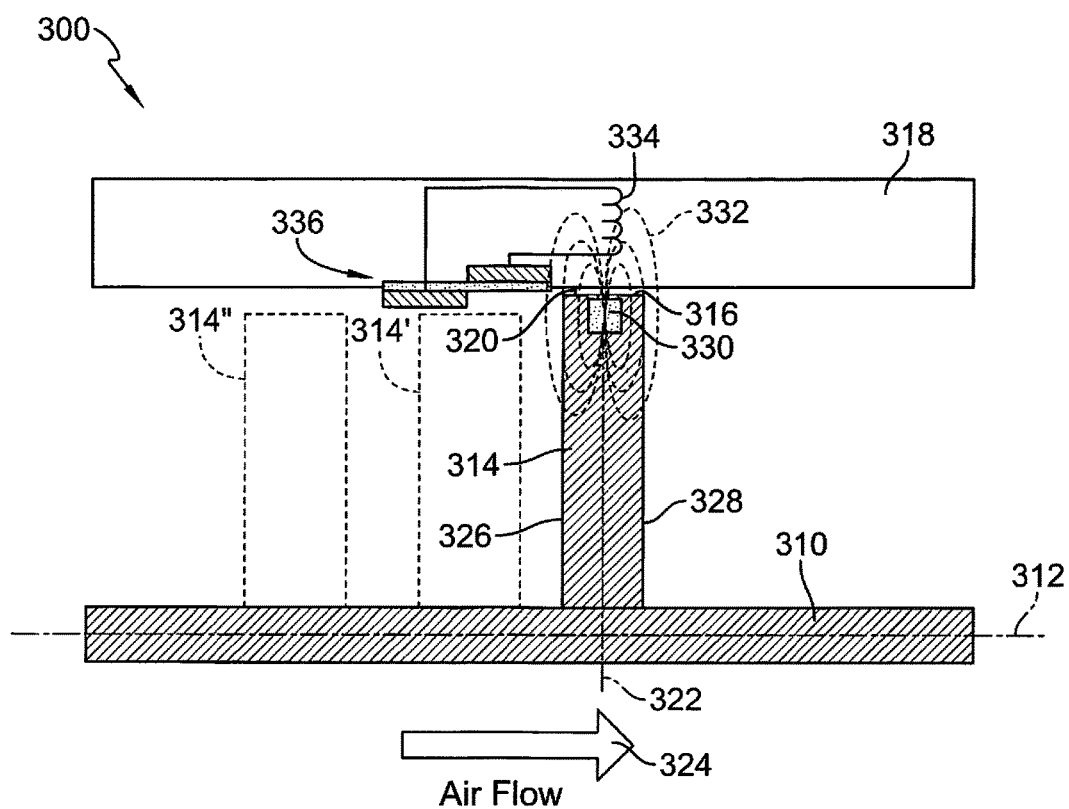
FIG. 3A is a simplified cross-sectional view of at least one embodiment of a compressor rotor blade, a plasma actuator, a magnet, and an induction coil, and showing, schematically, electrical coupling between the plasma actuator and the induction coil, as disclosed herein.
Figure 3B:
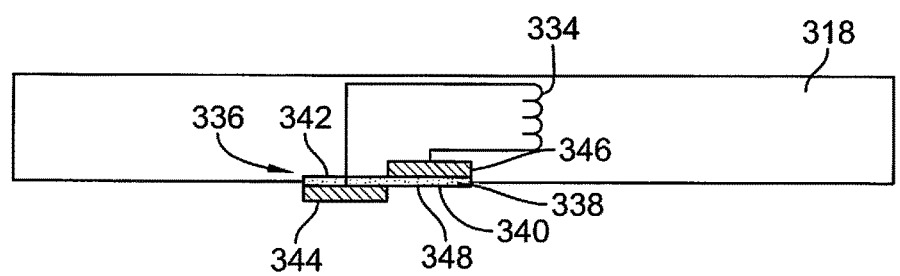
FIG. 3B is a simplified cross-sectional view of at least one embodiment of the plasma actuator, the induction coil, and the engine case of FIG. 3A, as disclosed herein.
Figure 4:
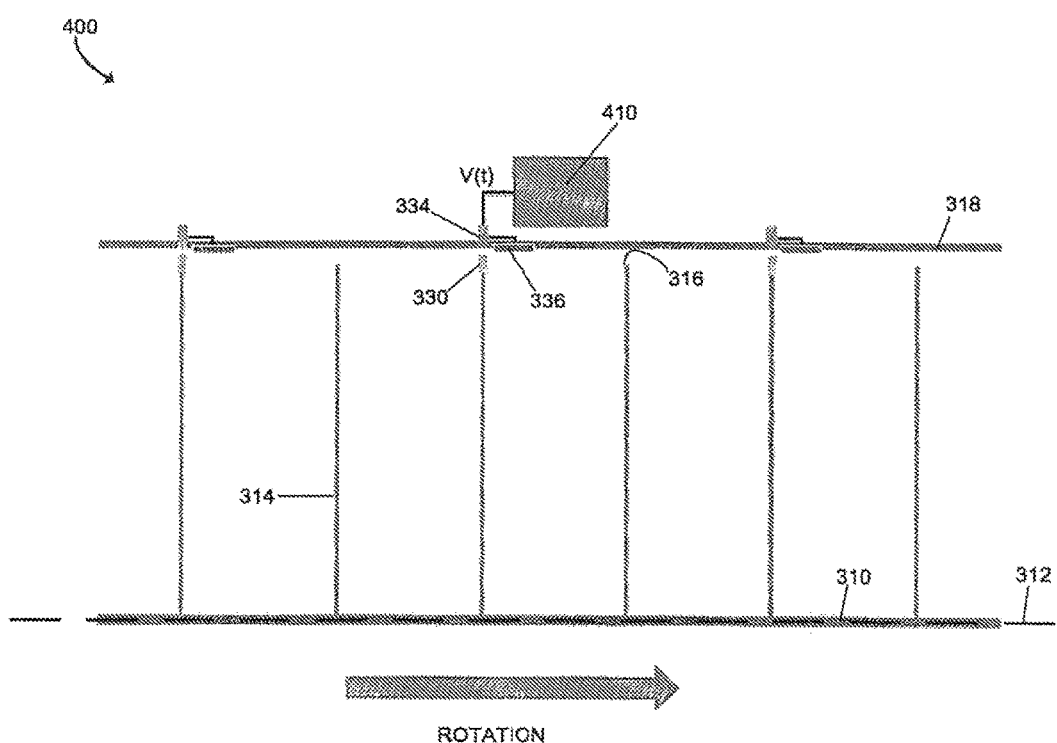
FIG. 4 is a simplified cross-sectional view of at least one embodiment of a multistage compressor including plasma actuators and aeroelastic instability detection logic as disclosed herein.

Referring now to FIG. 1, an embodiment of a gas turbine engine system 100 includes a turbine engine 110, electrical machines 132, a vehicle electrical system 138, and a control unit 146. As shown in the subsequent figures and described in more detail below, the turbine engine 110 includes one or more compressors 116 and turbines 122, 124. Any one or more of the compressors 116 is implemented using one or more flow control systems 126, in which plasma actuators provide active flow control to prevent rotor blade tip clearance flow leakage. In some embodiments, the flow control systems 126 are powered by inductive coils that translate time-varying magnetic flux induced by the rotation of the rotor blades into electrical power, as shown in FIGS. 3A and 3B, described below. The plasma actuators may remove the flow blockage that can occur in the tip region, which provides a substantial aerodynamic benefit. In some embodiments, electrical energy (e.g., current) is supplied to the flow control systems 126, as shown in FIG. 4, described below. The application of electrical energy to the flow control systems 126 causes a local air flow perturbation by applying a voltage across a pair of asymmetric electrodes. The voltage difference across the electrodes creates an electric field that ionizes the surrounding air causing the air to accelerate through the electric field. The aeroelastic instability detection logic 148, executed by the control unit 146, determines the blade position and detects if the gas turbine engine is experiencing forced vibrations or flutter. The control unit 146 can then change the operating parameters of the gas turbine engine to improve engine output and reduce wear and tear on the engine. In some embodiments, the aeroelastic instability detection logic 148 can change the voltages applied to the plasma actuators to mitigate rotor blade tip flow leakage. In this way, the gas turbine engine system 100 can reduce vibrations or flutter experienced by the gas turbine engine 110.

Referring now in more detail to the embodiment of FIG. 1, the illustrative turbine engine 110 is a multi-shaft turbofan gas turbine engine configured for aerospace applications; however, aspects of the present disclosure are applicable to other types of turbine engines, including various types of turboprop and turboshaft systems and turbine engines that are configured for other, non-aerospace types of applications (e.g., marine, etc.). In the turbine engine 110, a fan 112 (e.g., a fan, variable pitch propeller, etc.) draws air into the engine 110. Some of the air may bypass other engine components via a bypass region 127 (e.g., a bypass duct), and thereby generate propulsive thrust. The remaining air is delivered to one or more compressors 116. In some embodiments, a low pressure compressor may increase the pressure of air received from the fan 112, and a high pressure compressor may further increase the pressure of air received from the low pressure compressor. In any event, the compressor(s) 116 increase the pressure of the air and forward the higher-pressure air to a combustor 118.

In the combustor 118, the pressurized air is mixed with fuel, which is supplied to the combustor 118 by a fuel supply (not shown). Typically, a flow meter, flow control valve, or similar device (e.g., a fuel flow sensor, FF 160) monitors and/or regulates the flow of fuel into the combustor 118. An igniter (not shown) is typically used to cause the mixture of air and fuel to combust. The high-energy combusted air is directed to one or more turbines 122, 124. In the illustrative embodiment, a high pressure turbine 122 is disposed in axial flow series with a low pressure turbine 124. The combusted air expands through the turbines 122, 124, causing them to rotate. The combusted air is then exhausted through, e.g., a propulsion nozzle (not shown), which may generate additional propulsive thrust.

The rotation of the turbines 122, 124 causes the engine drive shafts 114, 120, to rotate. More specifically, rotation of the low pressure turbine drives a low pressure shaft 114, which drives the fan 112. Rotation of the high pressure turbine 122 drives a high pressure shaft (or "compressor drive shaft") 120, which drives the compressor(s) 116. In some embodiments, the shafts 114, 120 may be concentrically disposed. In some embodiments, more than two shafts 114, 120 may be provided. For example, in some embodiments, an intermediate shaft is disposed concentrically between the low pressure shaft 114 and the high pressure shaft 120 and supports an intermediate-pressure compressor and turbine.

The illustrative turbines 122, 124 additionally drive one or more electrical machines 132 (via, e.g., a power take-off assembly or "more" electric technology). The electrical machines 132 may be embodied as, e.g., electric motors or motor/generators. The illustrative low pressure turbine 124 drives a motor/generator 134 via the low pressure shaft 114 and a power take-off assembly 128. The illustrative high pressure turbine 122 drives a motor/generator 136 via the high pressure shaft 120 and a power take-off assembly 130. The electrical machines 132 can generate electrical power, which may be supplied to an energy storage 133 or to a vehicle electrical system 138, for example. For instance, the motor/generator 134 may generate electrical power that is supplied to other components or systems of the aircraft or other vehicle to which it is coupled. The motor/generator 136 may operate similarly. Each or either of the motor/generators 134, 136 may have a motor mode in which the motor/generator 136 receives electrical energy from, for example, the energy storage 133 or the vehicle electrical system 138, and converts the received electrical energy into rotational power, which is then supplied to the high pressure turbine 122 via the power take-off assembly 130.

The control unit 146 controls the overall operation of the engine 110 or various components of the turbine engine system 100. For example, the control unit 146 may be embodied as a Full Authority Digital Engine Controller or FADEC, or may be embodied as a dedicated controller or electrical circuitry. In some embodiments of the control unit 146 is in electrical communication with the flow control systems 126 to send control signals to the flow control systems 126, e.g., to vary the voltage difference between the two electrodes of the plasma actuators and control the rotor blade tip clearance air flow. The illustrative control unit 146 is powered by electrical energy generated by the electrical machines 132 and provided to the vehicle electrical system 138 during operation of the turbine engine 110.

The control unit 146 receives electrical signals from a number of different sensors 160, which are installed at various locations on the turbine engine 110 and/or other components of the system (e.g., the compressor 116 and compressor drive shaft 120), to sense and/or measure various physical parameters such as temperature (T), shaft speed (SS), air pressure (P), and fuel flow (FF). Other parameters that may be measured by sensors 160 or calculated using data obtained by one or more sensors 160 include magnetic field intensity, circumferential phase, electrical current, air flow, pressure ratio, or other measurements that can be used to predict, for example, a surge margin or a flutter margin may be predicted by a FADEC model. When the turbine engine 110 is in operation, these parameters represent various aspects of the current operating condition of the turbine engine 110. The sensors 160 supply electrical sensor data signals representing instantaneous values of the sensed/measured information over time, to the control unit 146. In response to the sensor data signals, the control unit 146 supplies various commands to various components of the engine system 100, in order to control various aspects of the operation of the turbine engine system 100. The control unit 146 executes the aeroelastic instability detection logic 148 from time to time during operation of the turbine engine system 100 (e.g., in response to changes in operating conditions), and, in some embodiments, sends control signals to components of the flow control systems 126.

Figure 2:
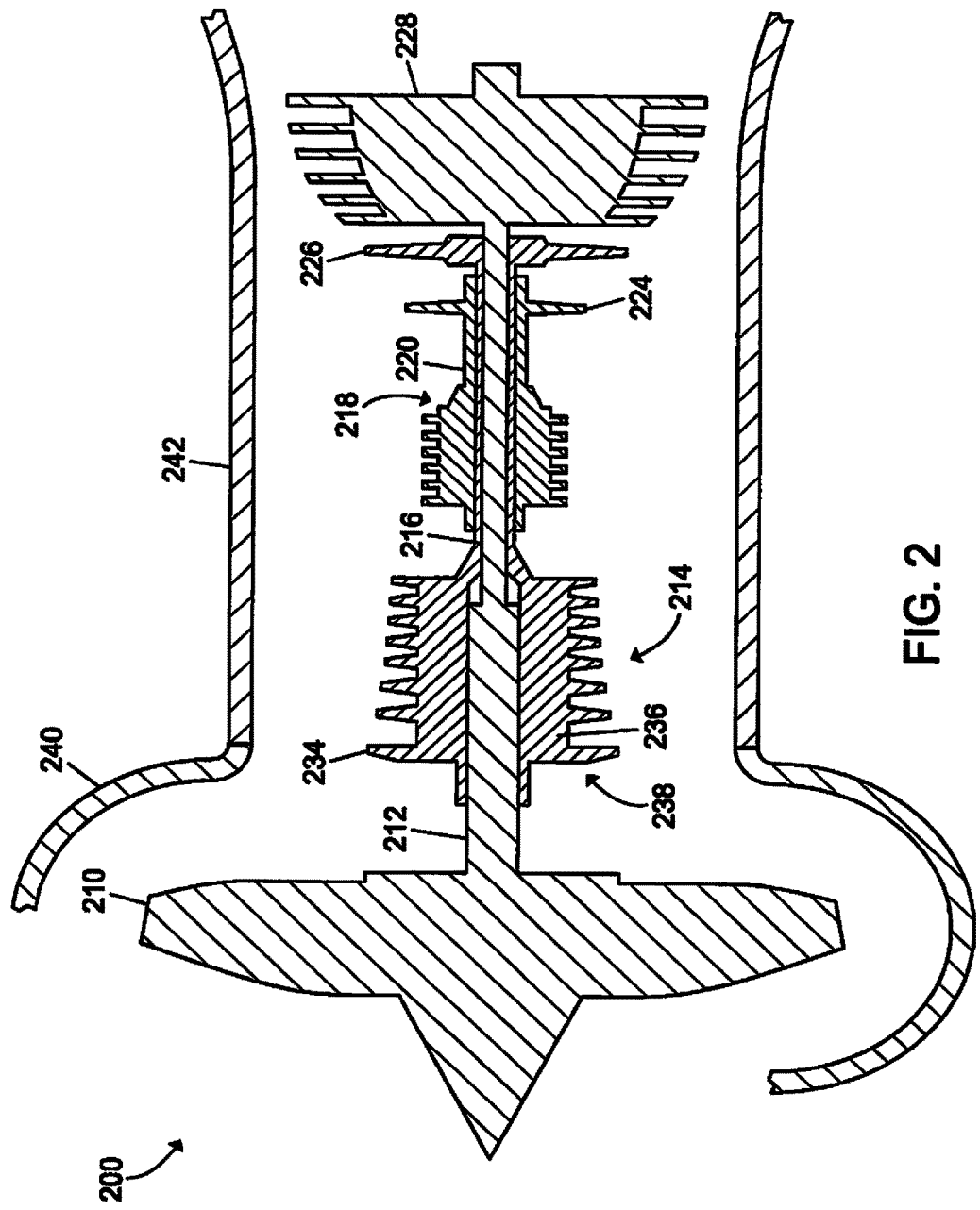
FIG. 2 is a simplified meridional sectional view of at least one embodiment of a gas turbine engine, which may be implemented in the gas turbine engine system of FIG. 1 as disclosed herein.

Referring now to FIG. 2, a greatly simplified view of an embodiment 200 of the turbine engine 110 is shown. The embodiment 200 includes a fan (or low pressure compressor) 210, a low pressure shaft 212, an intermediate pressure compressor 214, an intermediate pressure shaft 216, a high pressure compressor 218, a high pressure shaft 220, a high pressure turbine 224, an intermediate pressure turbine 226, and a low pressure turbine 228. The embodiment 200 of the turbine engine 110 also includes an engine case, e.g., a case 240 encompassing the fan 210 and a case 242 encompassing the shafts 212, 216, 220 and the other compressors 214, 218. The case 240 and the case 242 may be embodied as a single component or as multiple separate case sections. The shafts 212, 216, 220 are concentrically disposed. The illustrative intermediate pressure compressor 214 is a multistage compressor that includes a number of axially aligned stages, where each stage includes a rotor 238. Each rotor 238 includes a number of blades 234 that radially extend from a rotor wheel or hub 236. The rotors 218 of the high pressure compressor 218 are configured in a similar manner. While in FIG. 2 all of the rotor blades (e.g., blades 234) are shown as connected to a single wheel or hub (e.g., wheel/hub 236), individual rotors or groups of rotors may have separate rotor wheels/hubs in other embodiments. It should be noted that while FIG. 2 depicts a multistage axial compressor, aspects of this disclosure are analogously applicable to centrifugal compressors, mixed-flow compressors, single-stage fans, multi-stage fans, or other types of compressors or fans.

Referring now to FIGS. 3A and 3B, an embodiment 300 of the flow control systems 126 is shown. A rotor wheel or hub 310 rotates about a shaft axis 312. A rotor blade 314 extends from the rotor wheel 310 and terminates in a blade tip 316. The blade tip 316 is in close proximity to an engine case 318, and the distance between the blade tip 316 and the case 318 defines a tip clearance 320, for example, a typical tip clearance 320 for a gas turbine engine can range from 0 (which means the blade tip is in contact with the case) and 0.050 inches. Blade tip margins, or tip clearances, can fluctuate between gas turbine engines due to blade tip erosion, hard contact with the case, rotor/case eccentricity, etc. The rotation of the blade 314 about the shaft axis 312 defines a plane of rotation 322. Arrow 324 shows the airflow moving from left to right across FIG. 3A. The airflow movement defines an upstream side 326 of blade 314, oriented in the direction from which the air enters the gas turbine engine, and a downstream side 328 of blade 314, oriented in the direction that the air leaves the gas turbine engine. Coupled to the blade tip 316 is a magnet 330. The magnet 330 radiates magnetic flux 332. In some embodiments, the magnet 330 is a permanent magnet that is embedded on or just below the surface of the blade tip 316, with the permanent magnets polar axis oriented radially to cause the radiated magnetic flux 332 of the magnet 330 to interact with components coupled to the case 318. In some embodiments, not all of the blades 314 include a magnet 330.

An inductive coil 334 is coupled to the case 318. The illustrative inductive coil is aligned with the plane of rotation 322 of the blade 314. In other words, the inductive coil is positioned in the case 318 at the point closest to the blade tip 316 as the blade 314 rotates about the shaft axis 312. An illustrative embodiment of the inductive coil 334 includes a conductive material that is shaped such that a time-varying magnetic field can induce a current on the conductive material. The shape of the coils 334 should be such that it maximizes the magnetic flux 330 experienced by the coil 334. In some embodiments, the magnet 330 is circular in shape, with its polar axis oriented radially, and the coils 334 have a circular cross-section to maximize current induced in the coils 334 by magnetic flux. As the blade 314 rotates, the strength of the magnetic flux 332 experienced by the coils 334 varies, due to the relative motion between the rotor and the case. The time-varying magnetic flux created by the movement of the blade 314, and its related magnet 330, induces a current in the inductive coil 334. The inductive coil 334 is electrically connected to, and powers, a plasma actuator 336. Plasma actuator 336 is a device that provides low-weight, mechanically simple, modular flow control. By collocating the power source, i.e., the inductive coil 334, and the plasma actuator 336, the amount of mass added to the gas turbine engine by the active flow control measures can be minimized. Furthermore, this collocation design allows the active flow control system to have a modular design in which each inductive coil 334 and plasma actuator 336 collocated pair are independent from every other collocated pair. For example, the modular nature of the flow control unit 126 can ensure that the failure of a single unit will not threaten the operation of the entire system, and thus can make maintenance and replacement of the flow control systems 126 easier.

In some embodiments of the active flow control systems 126, the inductive coil 334 is connected in series to a plasma actuator 336, and the coil axis of the inductive coil 334 is oriented radially in the case 318, e.g., so the coil 334 can interact with the radiated magnetic flux 332. As the blade 314 rotates, the magnetic flux 332 radiated by the magnets 330 induces a time-varying current in the inductive coil 334, which powers the plasma actuator 336.

The plasma actuator 336 is coupled to the case 318. In some embodiments, the flow axis of the plasma actuator 336 is oriented orthogonal to the plane of rotation 322. The plasma actuator 336 is configured to energize the tip clearance air flow of the blade 314 thereby reducing blockage, reducing air leakage, and improving air flow in the gas turbine engine. The use of plasma actuators 336 as flow control can improve rotor performance by allowing more air to be used to generate energy, extend the surge margin of the engine, and reduce the forced vibrations and flutter of the engine.

In an illustrative embodiment, the plasma actuator 336 is a single dielectric barrier discharge type; however, other types of plasma actuators are also included in this disclosure, such as for example, double dielectric barrier discharge or multiple dielectric barrier discharge types. The illustrative plasma actuator 336 includes a dielectric layer 338, having a dielectric layer length, coupled to the case 318, which includes an outer surface 340 and an inner surface 342. An exposed electrode 344 is coupled to the dielectric layer 338 on the outer surface 340 and is electrically connected to the coil 334. The exposed electrode 344 has an exposed electrode length, which is shorter than the dielectric layer length, so the exposed electrode 344 does not span the entire length of the dielectric barrier 338. A buried electrode 346 is coupled to the inner surface 342 of the dielectric layer 338, positioned to be coupled along a length of the dielectric layer 338 that the exposed electrode 344 is not coupled, and the buried electrode 346 is also coupled to the coil 334. The buried electrode 346 has a buried electrode length, which is shorter than the dielectric barrier length, so the buried electrode 346 does not span the entire length of the dielectric layer 338. In an illustrative embodiment, the exposed electrode 344 and the buried electrode 346 do not overlap along the dielectric layer 338, i.e., if the exposed electrode 344 is coupled to a particular length of the dielectric layer 338, then the buried electrode 346 is not coupled to that same length of the dielectric barrier 338, and vice versa. The length of the outer surface 340 directly opposite the buried electrode 346 defines an exposed surface 348. In some embodiments, the exposed surface 348 is the outer surface 340 of the dielectric layer 338; however, other surfaces are also contemplated, such as, e.g., a protective layer being applied to the outer surface 340 such that the exposed surface 348 is the protective layer and not the outer surface 340.

In the illustrative embodiment of FIGS. 3A and 3B, the plasma actuator 336 is axially offset from the plane of rotation 322. In particular, the illustrative plasma actuator 336 is positioned before or ahead of the upstream side 326 of the blade 314. Other placements of the plasma actuators 336 are possible. For example, the plasma actuator 336 can be positioned behind the downstream side 328 of the blade as suggested in FIG. 3A by blade 314 "drawn in phantom, or the plasma actuator 336 can be positioned in the plane of rotation 322 of the blade on either side of the inductive coil 334 as suggested in FIG. 3A by blade 314 ' drawn in phantom. The plasma actuator 336 can be positioned anywhere in the case, as long as it is electrically connected to its power source, e.g., the inductive coil 334. Generally, the plasma actuator 336 is located close to its power source, in order to reduce the weight added to the turbine engine system 100 or for other reasons. In some embodiments, the plasma actuator 336 is positioned in the case 318 at an optimal location that is determined based on a need to minimize the blade tip air flow leakage.

Figure 3C:
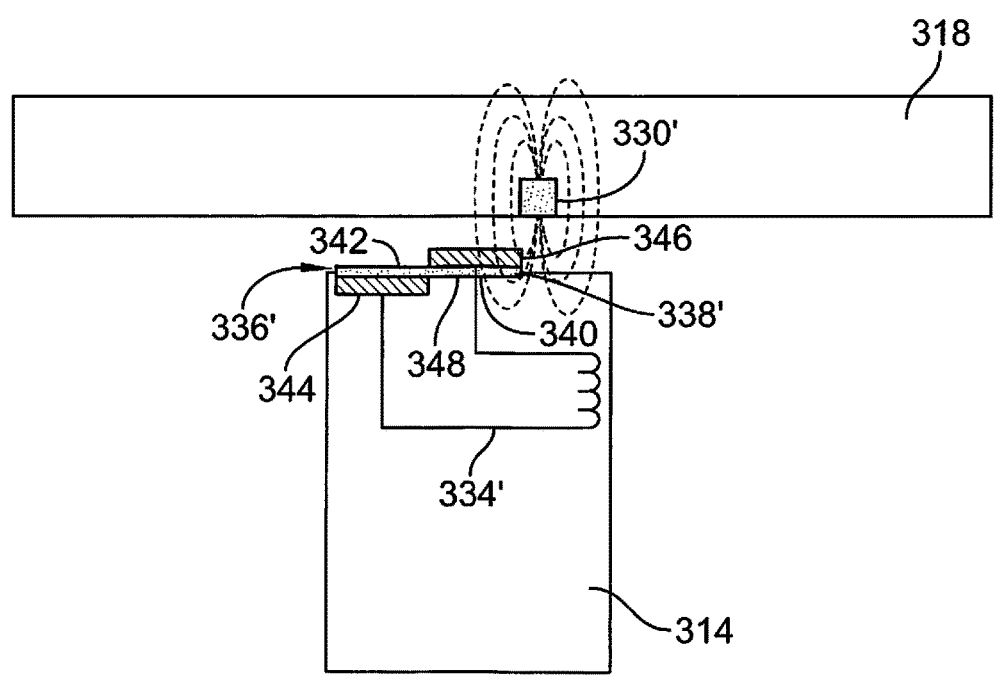
FIG. 3C is a simplified cross-sectional view of at least one embodiment of a plasma actuator, an induction coil, and an engine case, as disclosed herein.

In some embodiments of the flow control system 126, the installed positions of the magnet and the coil and plasma actuator pair are swapped as shown in FIG. 3O in comparison to the arrangement shown in FIG. 3A. In such embodiments, the magnet 330' is coupled to the engine case 318 such that a magnet 330' is located at least partially in the plane of rotation 322 of the blades 314 as shown in FIG. 3C. The magnet 330' is further positioned with the polar axis oriented radially, so that the magnetic flux radiated by the magnet 330' can interact with an inductive coil 334' that is coupled to the blade tip 316. The inductive coil 334' is electrically connected to a plasma actuator 336', which is positioned in the blade 314 substantially near the blade tip 316. The plasma actuator 336' is positioned in the blade 314 so that it can, e.g., mitigate the air flow leakage that occurs around the tip of the blade 314, and ensure the air moves with main flow field of the gas turbine engine 110. In other embodiments, the coils 334 could be embedded in the rotor and the plasma actuators 336 would be secured to the blade tips 316, while the magnetic elements would be embedded in the case. This arrangement enables much higher magnetic field intensities because larger magnets could be in the case than on a rotating component. A potential tradeoff from this arrangement is that the coils 334 would have a smaller area, thereby reducing the magnetic flux through the coils 334.

Referring now to FIG. 4, an embodiment 400 of the flow control systems 126 is shown. The view of FIG. 4 is along the engine axis, and, although the view is simplified and does not show a hub or case curvature to indicate rotational motion (as opposed to linear motion) of the bladerow, the blades 314 are rotating in the plane of the page. Thus, each of the actuator circuits 334, 336 is embedded at a different circumferential location at the same axial station.

It should be understood that while certain fundamental elements of the actuator circuit are shown in FIG. 4, for instance, the induction coil (power generation) 334 and plasma actuator 336, other elements (e.g., diodes and capacitors) may be necessary or desirable, for example, to condition the voltage waveform, to store or release energy, or for other reasons. Similar to the description of FIGS. 3A and 3B, the embodiment 400 includes a hub 310 rotating about a shaft axis 312, a number of blades 314, at least some of which are coupled to the hub 310 and terminate in a tip 316, and a case 318, which surrounds the blade and hub system. A magnet 330 is coupled to the tip 316 of the blade 314 and both a number of inductive coils 334 and a number of plasma actuators 336 are coupled to the case 318. Other details shown in FIG. 4 correspond to similar features shown in FIGS. 3A and 3B, described above; the description of those details is not repeated here.

The embodiment 400 shows less than all of the blades 314 (e.g., a subset of the blades 314) equipped with a magnet 330, inductive coil 334, and plasma actuator 336. In the illustrative embodiment of FIG. 4, designs of a gas turbine engine system 100 include having certain rotor wheels and blade sets being installed with the active flow control systems, but other rotor wheels and blade sets do not include the active flow control systems. This arrangement can be used to balance the improvements to engine performance provided by the active flow control systems 126 with the added weight those same active flow control systems 126 may add to the gas turbine engine system 100. In FIG. 4, the plasma actuators 336 are axially offset from the plane of rotation 322 behind (e.g., in back of) the downstream side 328 of the blade 314.

Electronics 410 are electrically connected to a number of inductive coils 334 and/or the plasma actuators 336. Each of the actuator circuits (334, 336) transmits a time-varying voltage signal V(t) to the electronics 410. While only the fundamental elements of the actuator circuit (e.g., the induction coil 334 (for power generation) and the plasma actuator 336 are shown in the drawings, it should be understood that the actuator circuit 334, 336 may include other elements as needed, in order to condition the voltage waveform, store and release energy, e.g. diodes and capacitors, etc.

The electronics 410 analyze the time-varying voltage signals V(t) induced in the coil 334 by the magnets 330 coupled to the blade 314 to determine the real-time position of the blade 314. Using the real-time position of the blade 314, the electronics 410 can detect, e.g., flutter and forced vibration occurring in the gas turbine engine 110. In some embodiments, the electronics 410 are, e.g., strategically connected to less than all of the inductive coils 334 to minimize the weight added by the electronics 410 to the gas turbine engine 110 while still providing effective measurements of blade positions. In other embodiments, the electronics 410 can be used, e.g., to alter the amount of air movement induced by the plasma actuator 336 by applying power directly to the inductive coil 334 and the plasma actuator 336. In this way, the active flow control system 126 can adjust the amount of power delivered to the plasma actuator 336 in order to mitigate flutter and forced vibration in the engine, or for other reasons. In other embodiments, additional power may be supplied to the flow control system, for example, by a battery, by an auxiliary power unit, or by a motor-generator.

Figure 5:
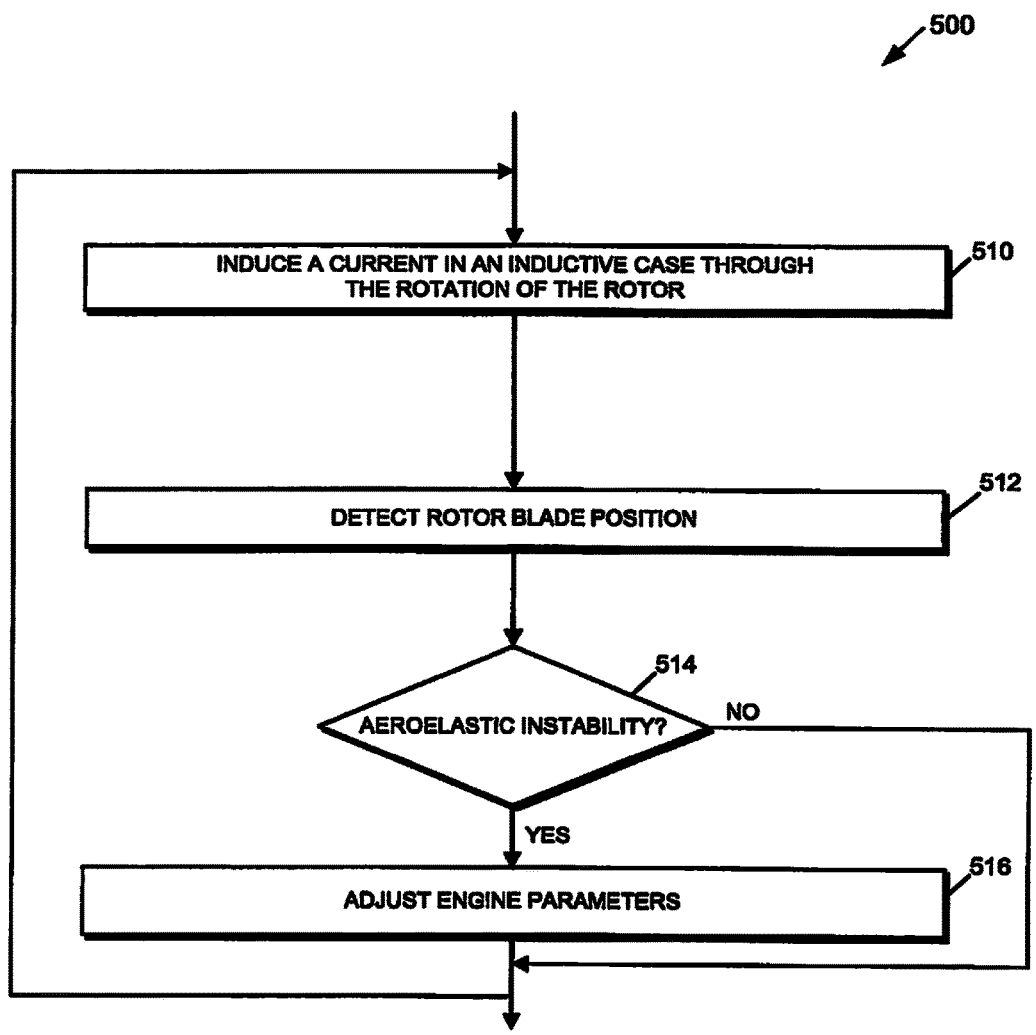
FIG. 5 is a simplified flow diagram of at least one embodiment of a process executable by the computing system of FIG. 1 to provide rotor blade tip clearance control as disclosed herein.

Referring now to FIG. 5, an illustrative process 500 for detecting aeroelastic instability in a turbine engine system is shown. Aspects of the process 500 may be embodied as electrical circuitry, computerized programs, routines, logic, and/or instructions executed by the turbine engine system 100, for example by the aeroelastic instability detection logic 148 and/or other components of the control unit 146. At block 510, the rotation of a component of the gas turbine engine system 100 equipped with a flow control system as described above induces a current in an inductive coil coupled to the compressor case. To do this, magnets are coupled to the tips of the blades of the rotor and conductive coils are coupled to the case of the gas turbine engine. The motion of the magnets, caused by the motion of the rotor, creates a time-varying magnetic field that interacts with the relatively stationary coils coupled to the case to induce a current in the coils. The coils are electrically connected to the plasma actuators and the induced current then powers the actuators. At block 512, control circuitry of the system 100 detects the currents induced by the time-varying magnetic flux and uses those currents to determine the positions of the blades as they rotate around an axis of rotation. At block 514, the control circuitry of the system 100 uses the positional data of the blades to determine if the gas turbine engine is experiencing any forced vibrations or flutter. Forced vibrations and flutter cause, e.g., degradation of the engine's performance and damage to the components of the gas turbine engine 110.

If the aeroelastic instability of the engine is enough to affect the performance of the engine, e.g., the engine is experiencing forced vibrations or flutter, at block 516, the control circuitry of the system 100 adjusts various parameters to stop the vibrations or the flutter. In some embodiments, the control circuitry can adjust global engine parameters, such as, for example, engine speed, to reduce the vibrations being experienced by the motor. In other embodiments, the control circuitry can adjust the voltage being applied to the plasma actuators to increase the electromagnetic field created by the plasma actuators and increase the movement of air caused by the plasma actuators. As the electric field created by plasma actuators increases, more air is ionized, which in turn induces more air to flow with the main flowfield. Inducing air flow in the normal or preferred direction of airflow at the location of blade air flow leakage reduces the amount of air flow leakage that occurs. If no aeroelastic instability is detected, then no engine parameters are changed.

Figure 6:
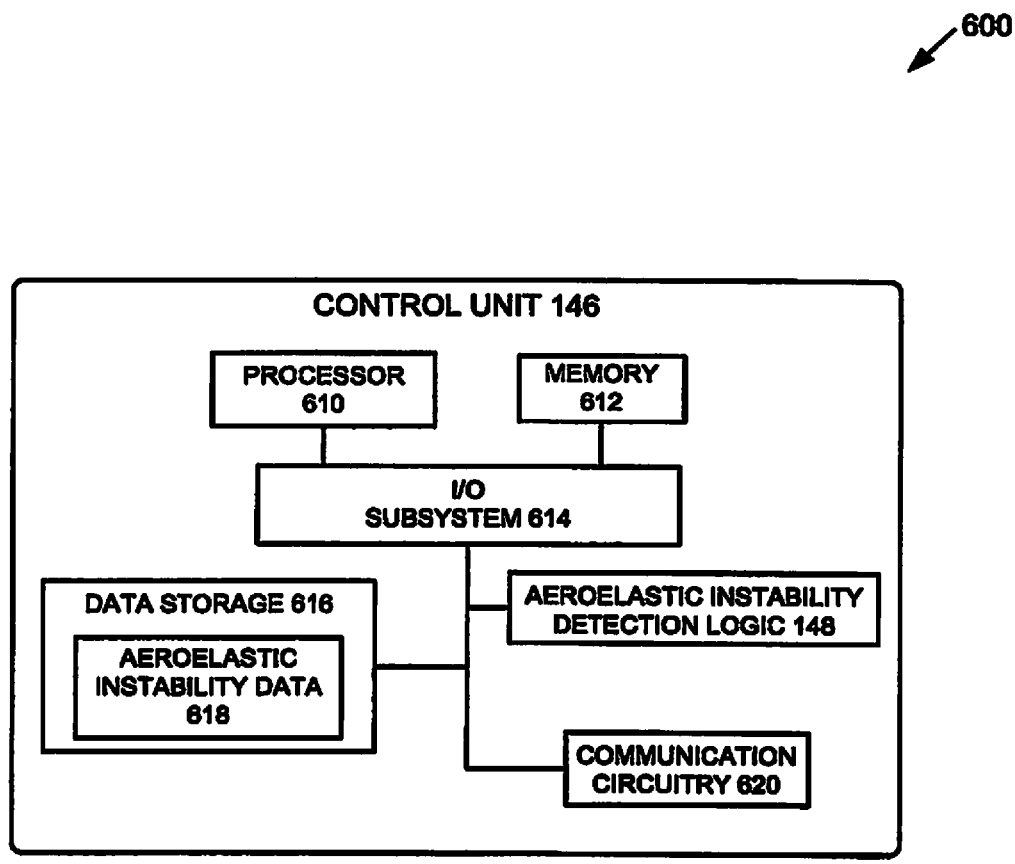
FIG. 6 is simplified block diagram of an exemplary computing environment in connection with which at least one embodiment of the system of FIG. 1 may be implemented.

Referring now to FIG. 6, an embodiment of the control unit 146 is shown. The illustrative control unit 146 is embodied as electrical circuitry, which may include one or more computing devices having hardware and/or software components that are capable of performing the functions disclosed herein, including the functions of the aeroelastic instability detection logic 148. As shown, the control unit 146 may include one or more other computing devices (e.g., servers, mobile computing devices, etc.), which may be in communication with each other and/or the control unit 146 via one or more communication networks (not shown), in order to perform one or more of the disclosed functions. The illustrative control unit 146 includes at least one processor 610 (e.g. a controller, microprocessor, microcontroller, digital signal processor, etc.), memory 612, and an input/output (I/O) subsystem 614. The control unit 146 may be embodied as any type of electrical circuitry, which may include one or more controllers or processors (e.g., microcontrollers, microprocessors, digital signal processors, field-programmable gate arrays (FPGAs), programmable logic arrays (PLAs), etc.), and/or other electrical circuitry. For example, portions of the control unit 146 may be embodied as a computing device, such as a desktop computer, laptop computer, or mobile computing device (e.g., handheld computing device), a server, an enterprise computer system, a network of computers, a combination of computers and other electronic devices, or other electronic devices. Although not specifically shown, it should be understood that the I/O subsystem 614 typically includes, among other things, an I/O controller, a memory controller, and one or more I/O ports. The processor 610 and the I/O subsystem 614 are communicatively coupled to the memory 612. The memory 612 may be embodied as any type of suitable computer memory device (e.g., volatile memory such as various forms of random access memory).

The I/O subsystem 614 is communicatively coupled to a number of hardware and/or software components, including a data storage device 616, communication circuitry 620, and aeroelastic instability detection logic 148. The data storage device 616 may include one or more hard drives or other suitable persistent data storage devices (e.g., flash memory, memory cards, memory sticks, and/or others). Aeroelastic instability data 618, and/or any other data needed by the aeroelastic instability detection logic 148 to perform the functions disclosed herein, may reside at least temporarily in the data storage device 616 and/or other data storage devices of or coupled to the control unit 146 (e.g., data storage devices that are "in the cloud" or otherwise connected to the control unit 146 by a network, such as a data storage device of another computing device). Portions of the aeroelastic instability detection logic 148 may reside at least temporarily in the data storage device 616 and/or other data storage devices that are part of the control unit 146. Portions of the aeroelastic instability data 618 and/or the aeroelastic instability detection logic 148 may be copied to the memory 612 during operation of the gas turbine engine system 100, for faster processing or other reasons.

The communication circuitry 620 may communicatively couple the control unit 146 to one or more other devices, systems, or communication networks, e.g., a local area network, wide area network, personal cloud, enterprise cloud, public cloud, and/or the Internet, for example. Accordingly, the communication circuitry 620 may include one or more wired or wireless network interface software, firmware, or hardware, for example, as may be needed pursuant to the specifications and/or design of the particular turbine engine system 100.

The aeroelastic instability detection logic 148 is embodied as one or more computer-executable components and/or data structures (e.g., computer hardware, software, or a combination thereof). Particular aspects of the methods and analyses that may be performed by the aeroelastic instability detection logic 148 may vary depending on the requirements of a particular design of the turbine engine system 100. Accordingly, the examples described herein are illustrative and intended to be non-limiting. Further, the control unit 146 may include other components, sub-components, and devices not illustrated herein for clarity of the description. In general, the components of the control unit 146 are communicatively coupled by electronic signal paths, which may be embodied as any type of wired or wireless signal paths capable of facilitating communication between the respective devices and components.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or nonvolatile memory.

Modules, data structures, and the like defined herein are defined as such for ease of discussion, and are not intended to imply that any specific implementation details are required. For example, any of the described modules and/or data structures may be combined or divided into submodules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A gas turbine engine system comprising:
a turbine engine comprising:
a compressor case defining an interior region;
in the interior region of the compressor case:
a drive shaft rotatable around an axis of rotation,
a compressor coupled to the drive shaft, the compressor having a plurality of rotor wheels and a plurality of blades extending radially from each of the rotor wheels, each of the blades having a root coupled to the rotor wheel and a tip spaced apart from the root by a length of the blade, each of the rotor wheels being rotatable with the drive shaft around the axis of rotation, and each of the rotor wheels and corresponding blades defining a plane of rotation;
a plurality of plasma actuators coupled to the compressor case,
a plurality of magnets, at least one magnet located at the tip of each of the plurality of blades for rotation therewith, and
a plurality of inductive coils electrically coupled to the plurality of plasma actuators such that the inductive coils generate a current that powers the plurality of plasma actuators in response to a varying magnetic flux created by the magnets rotating about the axis with the plurality of blades during operation of the turbine engine.

2. The gas turbine engine system of claim 1, wherein one of the plurality of inductive coils comprises a coil of conductive wire coupled to the compressor case.

3. The gas turbine engine system of claim 1, wherein each of the plurality of plasma actuators includes a single dielectric barrier discharge plasma actuator.

4. The gas turbine engine system of claim 1, wherein at least one of the plurality of plasma actuators is axially offset from the plane of rotation of the rotor wheel.

5. The gas turbine engine system of claim 4, wherein at least one of the plurality of plasma actuators is positioned on an upstream side of the plane of rotation of the rotor wheel.

6. The gas turbine engine system of claim 4, wherein at least one of the plurality of plasma actuators is positioned on a downstream side of the plane of rotation of the rotor wheel.

7. The gas turbine engine system of claim 1, wherein at least one of the plurality of plasma actuators is positioned within the plane of rotation of the rotor wheel.

8. A gas turbine engine system comprising:
a turbine engine comprising:
a compressor case defining an interior region;
within the interior region of the compressor case:
a drive shaft rotatable around an axis of rotation, and
a compressor coupled to the drive shaft, the compressor having a plurality of rotor wheels and a plurality of blades extending radially from each of the rotor wheels, each of the blades having a root coupled to the rotor wheel and a tip spaced apart from the root by a length of the blade, each of the rotor wheels being rotatable with the drive shaft around the axis of rotation, each of the rotor wheels and corresponding blades defining a plane of rotation;
a plurality of plasma actuators coupled to the blades near the tips of each of the blades,
a plurality of magnets located in the compressor case, and
a plurality of inductive coils electrically coupled to the plurality of plasma actuators and located near the tips of the blades such that the inductive coils generate a current that powers the plurality of plasma actuators in response to a varying magnetic flux created by the magnets and plurality of inductive coils during operation of the turbine engine.

9. The gas turbine engine system of claim 8, wherein at least one of the plurality of inductive coils comprises a conductive wire coupled to the blades.

* * * * *